United States Patent
Chen et al.

(10) Patent No.: US 9,885,809 B2
(45) Date of Patent: Feb. 6, 2018

(54) REDUCING OPTICAL EFFECTS IN A DISPLAY

(75) Inventors: Cheng Chen, Cupertino, CA (US);
John Z. Zhong, Cupertino, CA (US);
Wei Chen, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 759 days.

(21) Appl. No.: 13/584,781

(22) Filed: Aug. 13, 2012

(65) Prior Publication Data

US 2012/0307364 A1 Dec. 6, 2012

Related U.S. Application Data

(62) Division of application No. 12/347,556, filed on Dec. 31, 2008, now Pat. No. 8,243,426.

(51) Int. Cl.
*G02B 1/11* (2015.01)
*G02B 1/111* (2015.01)
(Continued)

(52) U.S. Cl.
CPC .......... *G02B 1/11* (2013.01); *G02B 1/005* (2013.01); *G02B 1/111* (2013.01); *G02F 1/1339* (2013.01);
(Continued)

(58) Field of Classification Search
CPC ........ G02B 1/11; G02B 1/118; G02B 5/0278; G02B 1/111; G02B 27/0018; G02B 1/10; C03C 2217/00; G02F 1/133502; G02F 1/13338; G02F 1/133308; G02F 1/1339; G02F 1/13392; G02F 1/13394;
(Continued)

(56) References Cited

U.S. PATENT DOCUMENTS 3,700,478 A * 10/1972 Bingham ................ C03C 17/00
359/514
5,578,404 A * 11/1996 Kliem ........................ G03C 7/12
349/106
(Continued)

FOREIGN PATENT DOCUMENTS

CN 1662625 8/2005
CN 1979231 6/2007
(Continued)

OTHER PUBLICATIONS

JP 07160422A, (English Machine Translation), Mizushima, Naomichi, Jun. 1995.*
(Continued)

*Primary Examiner* — Thomas K Pham
*Assistant Examiner* — Alberto Betancourt
(74) *Attorney, Agent, or Firm* — Kendall W. Abbasi

(57) ABSTRACT

One embodiment may take the form of a system for reducing the appearance of optical effects in a display. The system may include an enclosure with a first surface and a second surface. Furthermore, the system may include spacers that may be deposited on the bottom face of the first surface and/or the top face of the second surface, where the first surface may be a touch panel and/or cover lens and the second surface may be a display module. The spacers may be deposited in one layer with an anti-reflection coating. The thickness of the coating may be less than the diameter of the spacers.

14 Claims, 8 Drawing Sheets

(51) Int. Cl.
 *G02F 1/1333* (2006.01)
 *G06F 3/041* (2006.01)
 *G02F 1/1339* (2006.01)
 *G02B 1/00* (2006.01)
 *G02F 1/1335* (2006.01)

(52) U.S. Cl.
 CPC ...... *G02F 1/13338* (2013.01); *G02F 1/13392* (2013.01); *G02F 1/13394* (2013.01); *G02F 1/133308* (2013.01); *G02F 1/133502* (2013.01); *G02F 2001/13396* (2013.01); *G02F 2001/13398* (2013.01); *G06F 3/041* (2013.01)

(58) Field of Classification Search
 CPC . G02F 2001/13396; G02F 2001/13398; G06F 3/041; G06F 3/045; B05D 1/10; B32B 27/00; Y10T 428/12569; Y10T 428/2998; C23C 28/00
 USPC .... 359/601, 586–590; 349/1–18, 56, 64, 65, 349/125, 127, 135, 155, 156, 157, 162, 349/166; 427/162, 163.3, 164, 123, 180, 427/203, 195, 402; 250/221, 227.14, 250/227.17, 227.18, 227.2, 227.22, 250/227.23, 227.24, 227.28, 227.31, 250/227.32, 549
 See application file for complete search history.

(56) References Cited

U.S. PATENT DOCUMENTS

| | | | |
|---|---|---|---|
| 5,847,795 A * | 12/1998 | Satoh | G02B 1/11 349/137 |
| 5,869,919 A | 9/1999 | Sato et al. | |
| 6,356,259 B1 * | 3/2002 | Maeda | B32B 17/10018 156/99 |
| 6,512,670 B1 | 1/2003 | Boehme et al. | |
| 6,630,970 B2 | 10/2003 | Trapani et al. | |
| 6,937,249 B2 | 8/2005 | Herbert et al. | |
| 7,221,332 B2 | 5/2007 | Miller et al. | |
| 7,232,058 B2 | 6/2007 | Lee | |
| 7,413,331 B2 | 8/2008 | Hatanaka et al. | |
| 7,587,120 B2 | 9/2009 | Koo et al. | |
| 7,619,585 B2 | 11/2009 | Bell et al. | |
| 7,619,604 B2 | 11/2009 | Karman et al. | |
| 7,730,413 B1 | 6/2010 | Engel et al. | |
| 7,738,053 B2 | 6/2010 | Kubota | |
| 7,746,423 B2 | 6/2010 | Im et al. | |
| 7,936,426 B2 | 5/2011 | Harding et al. | |
| 7,962,186 B2 | 6/2011 | Cui et al. | |
| 8,054,391 B2 | 11/2011 | Ishikawa et al. | |
| 8,104,816 B2 | 1/2012 | Lupton et al. | |
| 8,105,507 B2 | 1/2012 | Jang et al. | |
| 8,143,598 B2 | 3/2012 | Lewis et al. | |
| 8,146,277 B2 | 4/2012 | Engel | |
| 8,243,426 B2 | 8/2012 | Chen et al. | |
| 8,493,365 B2 | 7/2013 | Jhu et al. | |
| 2002/0054261 A1 * | 5/2002 | Sekiguchi | G02F 1/13338 349/122 |
| 2002/0130849 A1 * | 9/2002 | Ahn | G02F 1/13338 345/173 |
| 2002/0145593 A1 * | 10/2002 | Boyd | G02B 6/0023 345/173 |
| 2003/0222857 A1 * | 12/2003 | Abileah | G02F 1/13338 345/173 |
| 2006/0188664 A1 * | 8/2006 | Ando | C09D 7/1266 428/1.1 |
| 2007/0178297 A1 * | 8/2007 | Takada | C08G 18/673 428/323 |
| 2007/0229475 A1 * | 10/2007 | Gettemy | G06F 1/1626 345/173 |
| 2008/0049431 A1 | 2/2008 | Boek et al. | |
| 2008/0122865 A1 | 5/2008 | Vanmoor | |
| 2008/0150901 A1 * | 6/2008 | Lowles | G02F 1/13338 345/173 |
| 2008/0160257 A1 * | 7/2008 | Takada | C08J 7/04 428/145 |
| 2008/0174724 A1 | 7/2008 | Nakayama et al. | |
| 2008/0186418 A1 * | 8/2008 | Kim | G06F 3/045 349/12 |
| 2008/0231548 A1 | 9/2008 | Koyama | |
| 2009/0135090 A1 | 5/2009 | Kim | |
| 2009/0174846 A1 | 7/2009 | Ito | |
| 2009/0201577 A1 | 8/2009 | LaPlante et al. | |
| 2009/0262084 A1 | 10/2009 | Yu | |
| 2010/0013787 A1 * | 1/2010 | Takahashi | G06F 3/041 345/173 |
| 2010/0026655 A1 * | 2/2010 | Harley | G06F 3/044 345/174 |
| 2010/0091039 A1 | 4/2010 | Marcu et al. | |
| 2010/0091048 A1 | 4/2010 | Aitken et al. | |
| 2010/0238366 A1 | 9/2010 | Chang et al. | |
| 2010/0265648 A1 | 10/2010 | Hirabayashi | |
| 2011/0007245 A1 | 1/2011 | Yoon et al. | |
| 2011/0091051 A1 | 4/2011 | Thomason et al. | |
| 2011/0128477 A1 | 6/2011 | Izaki et al. | |
| 2011/0199726 A1 | 8/2011 | Moser | |
| 2012/0188245 A1 | 7/2012 | Hyatt | |
| 2013/0084796 A1 | 4/2013 | Kerr | |
| 2013/0194281 A1 | 8/2013 | Chen et al. | |
| 2013/0335677 A1 | 12/2013 | You et al. | |

FOREIGN PATENT DOCUMENTS

| | | | |
|---|---|---|---|
| CN | 101243337 | | 8/2008 |
| CN | 101495891 | | 7/2009 |
| EP | 0272655 | | 6/1988 |
| EP | 1158484 | | 11/2001 |
| EP | 1355221 | | 10/2003 |
| EP | 1962265 | | 8/2008 |
| EP | 1390938 | | 12/2008 |
| EP | 2494603 | | 9/2012 |
| JP | 06006733 | | 1/1994 |
| JP | 07160422 A * | 6/1995 | |
| JP | 9-318817 | | 12/1997 |
| WO | WO0109664 | | 2/2001 |
| WO | WO0115128 | | 3/2001 |
| WO | WO05059880 | | 6/2005 |
| WO | WO06112740 | | 10/2006 |
| WO | WO2008117698 | * | 10/2008 |
| WO | WO 2008117698 A1 * | 10/2008 ............ G06F 3/041 |
| WO | WO 11/097393 | | 8/2011 |
| WO | WO 12/068543 | | 5/2012 |

OTHER PUBLICATIONS

Author Unknown, "Visual Impact/Usability Benefits," PureDepth, http://www.puredepth.com/technologyPlatform_visualImpactAndUsabilityBenefits, 2 pages, at least as early as Jan. 20, 2010.

Bertolucci, Jeff, "Offbeat Tech: The Misfits of CES," http://www.pcworld.com/article/186406/samsung_transparent_14inch_oled_laptop.html, 2 pages, Jan. 8, 2010.

Lau, "High-speed short-range systems for wireless personal area networks," Wireless Telecommunications Symposium, WTS 2009, IEEE, Piscataway, New Jersey, USA, Apr. 22, 2009, 4 pages.

* cited by examiner

REDUCING OPTICAL EFFECTS IN A DISPLAY

CROSS-REFERENCE TO RELATED APPLICATION

This application is a divisional of U.S. patent application Ser. No. 12/347,556, entitled "REDUCING OPTICAL EFFECTS IN A DISPLAY", filed on Dec. 31, 2008, now U.S. Pat. No. 8,243,426, which is incorporated by reference as if fully disclosed herein.

BACKGROUND

1. Technical Field

The present invention generally relates to displays and, more specifically, to maintaining the appearance of a display by reducing the appearance of optical effects on a display.

2. Background Discussion

Many computing devices use electronic displays to present information to a user. Such displays may be, for example, liquid crystal displays ("LCDs"), organic light emitting diode displays, cathode ray tube displays ("CRTs") and so on. A number of computing devices may include displays and/or screens with touch panel functionality where the user may select options and interact with the computing device via the display.

In particular, the user may physically touch the computing device with a stylus, finger, or any other appropriate object to select an option displayed on the computing device screen. For example, a user may use a stylus to select a date on a calendar displayed on the screen and then proceed to type on a keyboard that may be displayed on the screen. As the user brings the stylus into contact with the screen, the cover lens may curve and contact the display located underneath due to the physical pressure exerted thereon by the stylus. To achieve a compact design, the cover lens may be positioned close to the display surface. The variation of cover lens position in production can also result in a contact with the display. These arrangements and contacts may give rise to optical effects that distort images on the screen.

Thus, a method of correcting optical effects that may occur on the display is desirable. Accordingly, there is a need in the art for an improved method of providing a touch panel/cover lens that may be used with minimal optical distortion in the display.

SUMMARY

One embodiment of the present invention may take the form of a method for reducing the appearance of optical effects in a display. A first surface and a second surface may be at least partially surrounded by an enclosure and may be separated by a gap having a width. Generally, unless the enclosure is partially transparent, the enclosure may not surround the first surface. A minimum distance may be maintained, at the spacer, between the first surface and the second surface. That is, even when the first surface is pressed towards or otherwise deforms towards the second surface, the at least one spacer ensures the surfaces remain separated by the minimum distance. An anti-reflection coating may be deposited on the back of the first surface and/or the front of the second surface. Additionally, the first surface may be a cover lens and the second surface may be a display module.

Another embodiment of the present invention may take the form of a system for modifying the appearance of a display. The display may include a first surface and a second surface, an enclosure at least partially surrounding the first surface and the second surface and a plurality of spacers located between the first surface and the second surface, wherein the plurality of spacers prevent the first surface from physically contacting the second surface. The plurality of spacers may be located on at least one of the back of the first surface or the front of the second surface. Additionally, the display may include an anti-reflection coating deposited on at least one of the first surface or second surfaces. Furthermore, the anti-reflection coating and the plurality of spacers may form a single layer and may have similar refractive indices.

Yet another embodiment of the present invention may take the form of a system for preventing the appearance of optical effects in a display. The display may include an enclosure at least partially surrounding a first surface and a second surface, a coating on the bottom face of the first surface and on the top face of the second surface, and a plurality of spacers located between the first surface and the second surface, wherein the spacers are deposited at least partially within the coating. The coating and the plurality of spacers may be deposited as one layer, may have similar refractive indices and the coating may be a fluorinated polymer anti-reflection coating.

DETAILED DESCRIPTION OF EMBODIMENTS

Figure 1:
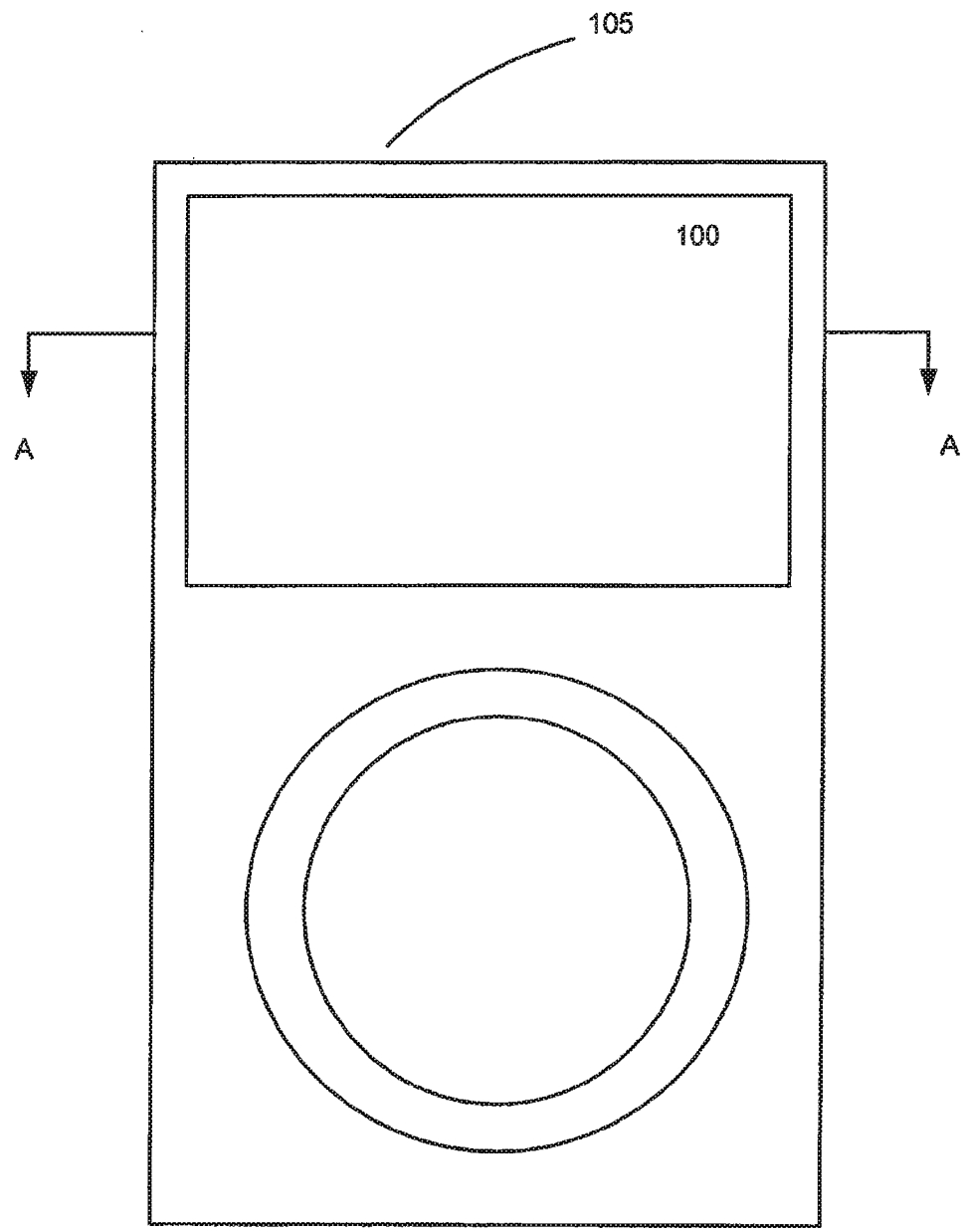
FIG. 1 depicts a general electronic device with a display.

Generally, one embodiment of the present invention may take the form of a method for reducing undesirable optical effects formed on or in the electronic display. In this embodiment, the electronic display may include two surfaces. One of the surfaces may be a display module and another surface may be a touch panel. There may be an air gap between the two surfaces. Continuing the description of this embodiment, spacers, such as spherical beads, may be provided on the front side of the display module and/or the back side of the touch panel. The spacers may prevent the two surfaces from coming into physical contact with one another to reduce distortion in the electronic display caused by optical effects and the spacers may be composed of a transparent material to prevent further optical distortion caused by the spacers themselves.

Another embodiment may take the form of a system for preventing optical effects that may occur on an electronic display. As discussed with respect to the previous embodiment, this embodiment may include a similar electronic device. In this embodiment, the surfaces may be glossy and/or transparent. Continuing the description of this embodiment, the spacers may be made of various transparent materials including, but not limited to, glass, plastic (such as fluorinated carbon, polycarbonates), sapphire, quartz, silicon oxide, generally and so on. Additionally, the spacers may be hollow beads, where the walls of the beads may be composed of solid materials or the spacers may be a solid transparent bead. The spacers may be randomly deposited onto either one or both of the surfaces and/or may be deposited in a pattern, such as an aligned grid, a spiraling pattern and so on. The spacers may be deposited in any number of ways including air spraying, spin coating, photolithography, slit coating, embossing and so on.

Yet another embodiment may take the form of a system for preventing optical effects that may occur on an electronic device. As discussed with respect to the previous embodiments, in this embodiment, the system may be a similar electronic device with the following differences. Continuing the description of this embodiment, the system may employ spacers in conjunction with anti-reflection coatings. The spacers and the anti-reflective coating may be combined in one or multiple layers on either one or both of the surfaces and both the spacers and anti-reflective may have the same refractive index. In this embodiment, the thickness of the anti-reflection coatings may be less than the diameter of the spacer.

It should be noted that embodiments of the present invention may be used in a variety of optical systems and image processing systems. The embodiment may include or work with a variety of display components, monitors, screens, images, sensors, computing systems, portable computing systems, handheld electronic devices and electrical devices generally. Aspects of the present invention may be used with practically any apparatus related to optical and electrical devices, display systems, presentation systems or any apparatus that may contain any type of display screen. Accordingly, embodiments of the present invention may be employed in computing systems and devices used in visual presentations and peripherals and so on.

Before explaining the disclosed embodiments in detail, it should be understood that the invention is not limited in its application to the details of the particular arrangements shown, because the invention is capable of other embodiments. Also, the terminology used herein is for the purpose of description and not of limitation.

Figure 2:
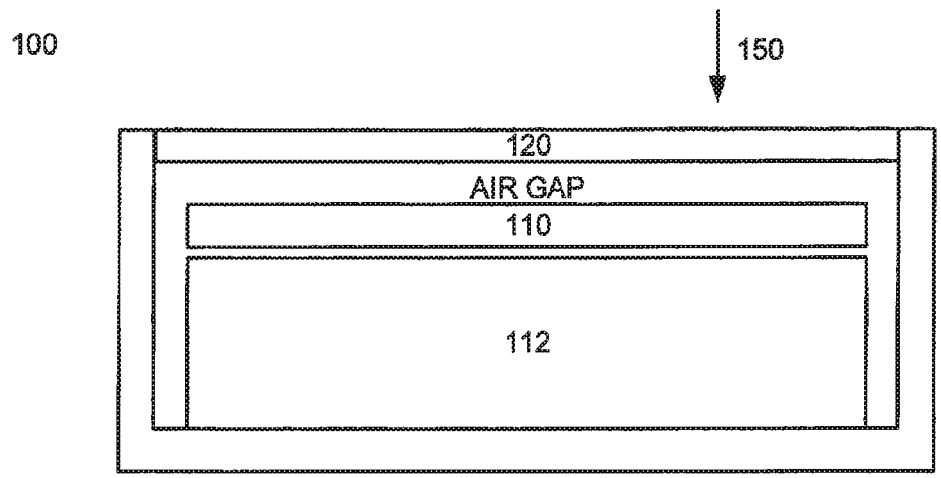
FIG. 2 depicts a cross-sectional view of a general electronic device with a display.

FIG. 1 depicts a sample electronic device display having a display 100. FIG. 2 depicts a cross-sectional view of the general electronic device display 100 of FIG. 1. The cross-sectional view of FIG. 2 is taken along line AA of FIG. 1. Generally, a user may view the electronic display 100 from the general direction as indicated by the arrow 150 in FIG. 2. The electronic device 100 may include two surfaces such as a display module 110 and a cover 120. In most cases, the cover may be located in front of the display module to protect the display module. The area 112 of FIG. 2 may provide functionality to the display module 110 and may include, for example, various electronic elements.

Additionally, the relationship between the various elements in FIGS. 2-6 are shown in an illustrative manner and the various elements may be arranged in alternative configurations. For example, the size, thickness and relationship between the elements may vary, the size air gap may be thinner relative to the thickness of the display module 110 and the cover 120, the display module 110 may extend outwardly to meet the outside enclosure and so on. In another example, in FIG. 4, a space is shown between the coating 140 and both of the display module 110 and the cover 120 for illustrative purposes as the coating 140 may be directly deposited on the display module 110 and the cover 120.

Some devices may incorporate touch panel functionality; thus, a touch panel 120 may be used in place of the cover. However, a touch panel may instead form part of the cover or be laminated to the cover. The surface 120 may be referred to herein as a cover lens, cover or a touch panel for explanatory purposes. Additionally, the discussion herein embraces any device with a display and a cover lens that may or may not include a touch panel. The touch panel 120 of FIGS. 2 and 3 may be transparent and both the touch panel 120 and the display module 110 may have glossy surfaces. The touch panel functionality will be discussed in further detail below. The electronic device 100 may include an air gap between the two surfaces. The thickness of the air gap may depend on the form factor of the electronic device 100. For example, as the profile of the electronic device becomes smaller and/or thinner, the distance between the touch panel 120 and the display module 110 may decrease. Accordingly, the air gap between the two surfaces may decrease as well. As the size of the air gap decreases, the optical effects that may distort the appearance of the images on the display typically appear. Although the discussion herein describes the gap between the two surfaces as an "air gap," it may be apparent to one skilled in the art that other gases or a vacuum may fill the gap. The optical effects will be discussed in further detail below.

Figure 3:
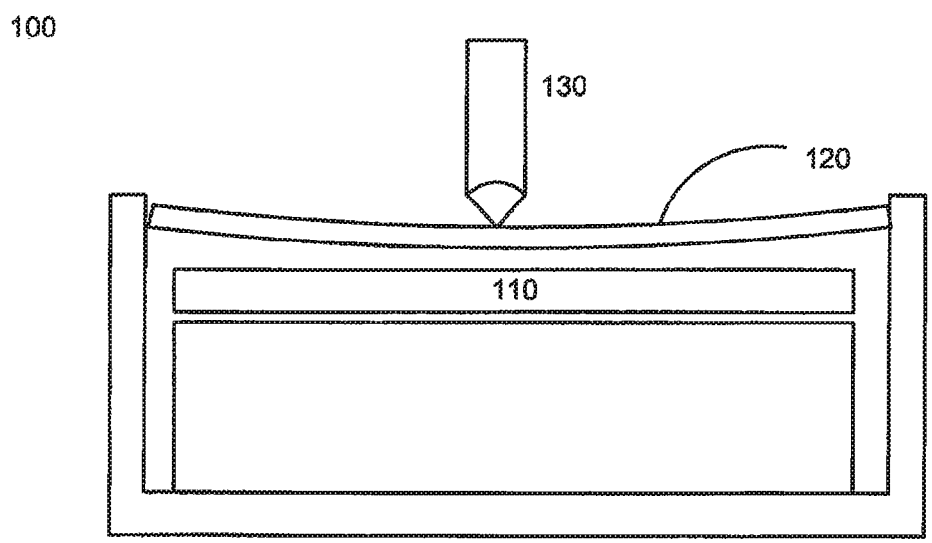
FIG. 3 depicts a cross-sectional view of the same general electronic display with touch panel functionality.

FIG. 3 depicts a cross-sectional view of the same general electronic device 100 as in FIG. 2, with a stylus 130 in contact with the touch panel 120. The cross-sectional view of FIG. 3 is along line AA of FIG. 1. In FIG. 3, the electronic device 100 may include a touch panel. A user may interface with the electronic device 100 by bringing the stylus 130 into physical contact with the touch panel 120. In FIGS. 2 and 3, the user may interact with and/or control the electronic device 100 via the touch panel 120 which may serve at least the purpose of protecting the display module 110 and conveying data via stylus interactions. Generally, the touch panel may sense physical contact through various technologies such as capacitive sensing, resistive sensing, pressure detection and so on. Additionally, various objects may be used to contact the touch panel 120. For example, a user may employ a finger, a stylus, a general writing utensil and so on to interact with the touch panel 120 of the electronic device 100. The stylus 130 is used herein for explanatory purposes only.

In FIG. 3, the stylus 130 is in contact with the touch panel 120. The stylus 130 may cause the touch panel 120 to curve and/or "deform" to such an extent that it partially comes into contact with the display module 110. Generally, a surface's arc or curve may be expressed as a radius of curvature. As the touch panel 120 momentarily curves, the touch panel radius of curvature may change and contribute to the occurrence of the optical effects. The radius of curvature is discussed in further detail below with respect to the optical effects.

In FIG. 3, the back surface of the touch panel 120 may come into contact with the front surface of the display module 110. The stylus may also cause the touch panel 120 and the display module 110 to come into near contact without physically touching as well. When the two surfaces come into contact or near contact, the display appearance may be distributed by optical effects such as wetting artifacts and/or Newton's rings.

Wetting effects may occur when two glossy surfaces come into contact or near contact with one another. Wetting effects may be undesirable because the two surfaces may adhere to each other and may be difficult to separate from one another once the surfaces come into contact. When the two surfaces are in contact, the Newton's ring effect may become more visible and the images on the display may become distorted or more difficult to view. The energy states of the surfaces and the wetting effect will be discussed in further detail below. Accordingly, in FIG. 3, when the stylus causes the touch panel 120 and the display module 110 to come into contact or near contact, the two surfaces may adhere. Coatings, as discussed herein with respect to FIG. 7, may be deposited onto the surfaces to reduce the wetting effect.

Similarly, Newton's rings may commonly occur between two surfaces that are in contact or near contact with one another. More specifically, Newton's rings may appear when a lens with small radius of curvature rests against a relatively flat surface such as plate glass. When light passes between the two surfaces, the light paths may refract and reflect and interfere to produce Newton's rings. For example, light may be refracted and reflected as it passes from air to the lens and from the lens to air due to the change in the index of refraction of the transmissive mediums. Light may be reflected while traveling from air into the lens and thereby undergo a 180-degree phase change, thus destructively interfering with the light reflected inside the lens (curved surface). The interference pattern may appear as alternating light and dark concentric rings.

Figure 4:
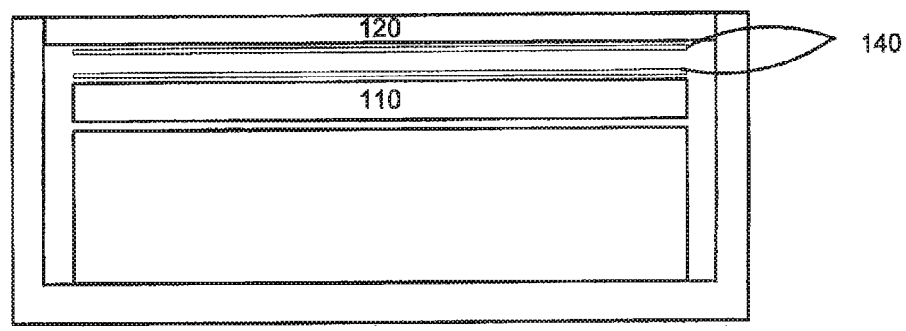
FIG. 4 depicts a cross-sectional view of another electronic display with coatings.

The appearance of the previously described optical effects may be reduced by employing an anti-glare ("AG") coating. AG coatings may consist of a rough layer of beads and may be approximately 100 microns thick in certain embodiments. As shown in FIG. 4 (the cross-sectional view of FIG. 4 is along line AA of FIG. 1), the AG coating 140 may coat the front surface of the display module 110 and the back surface of the touch panel 120 in order to provide a texture or roughness to the surfaces. Thus, the issues of wetting and Newton's rings may be reduced as the roughness may prevent the two surfaces from sticking together. Although the AG coating may reduce these optical effects, the roughness may itself diffract light and may dull the appearance of the display. Further an AG coating on the touch panel or the display module 110 may yield a "washed-out" appearance in sunlight making it difficult to use the electronic device outside, a decrease in display contrast ratio and sharpness and/or an optical effect referred to as "sparkling." Generally, sparkling occurs when the surface roughness and/or beads of the AG coating interfere with the pixels. When this happens, shiny spots may appear in the images on the display or the images on the display may "sparkle." Pixel interference and sparkling will be discussed in more detail below.

Another method currently employed to reduce the appearance of wetting and Newton's Rings is to employ a laminate display. Generally, laminate displays may be formed by depositing a transparent electrically conductive layer on a surface. Although employing a laminate display may reduce the wetting and Newton's Rings effects, the process may add manufacturing difficulties and complexity, thus reducing the product yield and making this option less desirable. Additionally, lamination may provide the benefit of increased sensitivity of the touch panel, but may also cause undesirable ripples in the displayed image when the stylus comes into contact with the touch panel. Lamination may also cause other issues regarding reliability, color shift, the ability to rework the product and so on.

Additionally, anti-reflection coatings 140 may be used to reduce Newton's Ring effects between the display module 110 and the touch panel 120. As depicted in FIG. 4, the anti-reflection coatings may be used on both the back surface of the touch panel 120 and the front surface of the display module 110. Because the coatings may reduce the reflective properties of the two glossy surfaces and may reduce the tendency to adhere to one another, the visibility of wetting and Newton's rings may be reduced.

Figure 5:
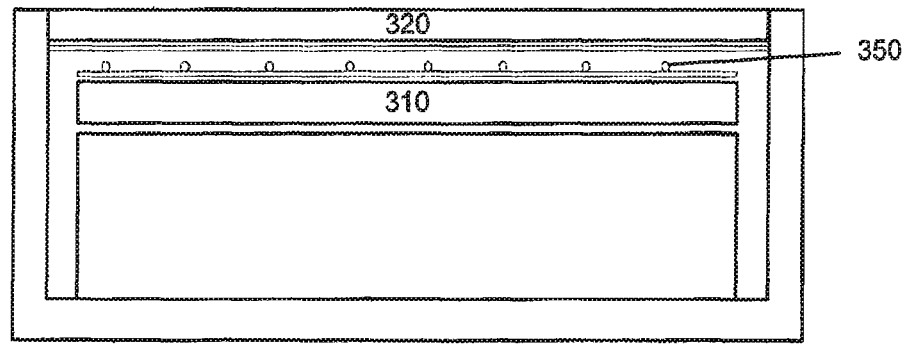
FIG. 5 depicts an embodiment of the present invention as a cross-sectional view of an electronic display with spacers inserted between the two surfaces.

FIG. 5 depicts a cross-sectional view of yet another electronic display 300. The cross-sectional view of FIG. 5 is along line AA of FIG. 1. Similar to FIGS. 2, 3 and 4, the electronic display 300 may include a display module 110 and a cover lens 120. The electronic display 300 may include touch panel functionality, and, in this case, the cover lens 120 may be a touch panel. As shown in FIG. 5, the display module 110 and the touch panel 120 may be included within an enclosure. The enclosure may surround the display module 110 and the touch panel 120.

Figure 6:
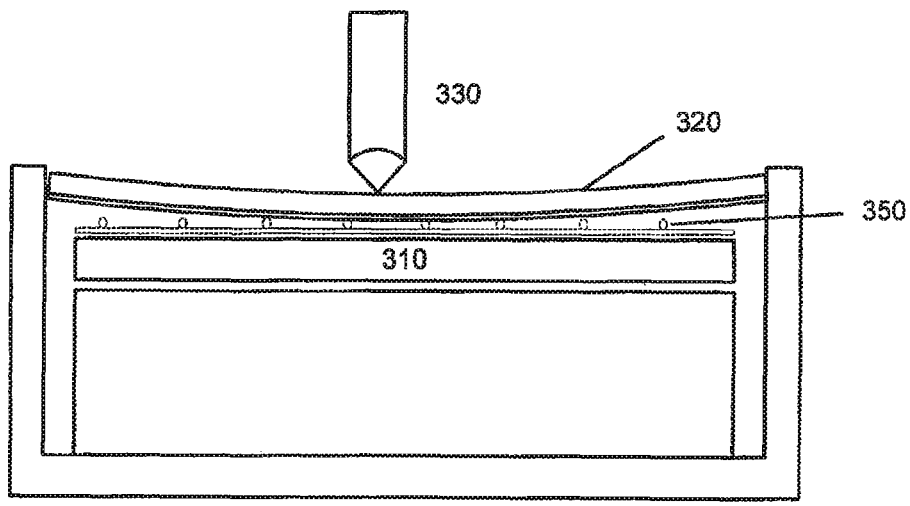
FIG. 6 depicts another cross-sectional view of FIG. 3 with a stylus in contact with the touch panel.

In FIG. 5, the electronic display 300 includes spacers 350 inserted between the two surfaces. The spacers may be deposited on the back surface of the touch panel 120 (not shown) or on the front surface of the display module 310 (shown in FIG. 5). The spacers may be various shapes including spheres, ellipses, parabolic forms and so on, and may be made of various materials such as glass, plastic, silicon dioxide or any other relatively transparent material. Additionally, the spacers may reduce or eliminate wetting and Newton's Rings effects when deposited between the two surfaces by preventing the touch panel 320 and the display module 310 from coming into physical contact with one another. The spacers may also provide a physical barrier to prevent the touch panel 320 and the display module 310 from coming into sufficiently close contact with one another to provide adverse optical effects. That is, the spacers may be physically "sandwiched" between the touch panel 320 and the display module 310 so that at least a minimum space between the two surfaces may be maintained at all times. This minimum space is approximately equal to the size of the spacers, as depicted in FIG. 6. The minimum distance will be discussed in further detail below.

As shown in FIG. 6, a stylus 330 may be in contact with the touch panel 320. The cross-sectional view of FIG. 6 is along line AA of FIG. 1. Similar to FIG. 3, the stylus 330 may push the touch panel 320 towards the display module 310. In FIG. 6, however, as the touch panel 320 curves downward, it may physically encounter the spacers before touching the display module 310. Thus, the spacers may function as a barrier between the touch panel 320 and the display module 310, generally ensuring the touch panel 320 and the display module 310 approximately maintain at least a minimum distance between the two surfaces. By maintaining at least this minimum distance, the air gap is large enough that the optical effects, both wetting and Newton's rings, may no longer manifest due to the lack of appropriate conditions.

As previously discussed, optical effects such as wetting and Newton's Rings may occur when two surfaces are placed into contact or near contact with one another. For example, an incident light ray may undergo reflection and refraction when passing through the top curved surface. Generally, refraction may occur when a light wave travels from a medium with a first index of refraction into another medium with a second index of refraction. At the boundary between the two media, the light wave phase velocity may change, which, in turn, may cause a direction change as well. For example, a light ray may refract or "bend" as it enters and leaves glass because there is a change in the indices of refraction of glass and air.

Additionally, the index of refraction is a measure for the reduction of the speed of light in a specific medium. As some examples, silicon dioxide has a refractive index of approximately 1.5 and air has a refractive index of approximately 1.0. Accordingly, light may travel through silicon dioxide at approximately 0.67 times the speed of light in a vacuum (1/1.5=0.67).

In one embodiment, refracted light may reflect off of a bottom surface, such as the display module 310 of FIG. 6, and the light may undergo a 180 degree phase change. The refracted and reflected light rays may then interfere with one another, both constructively and destructively, thus producing the light and dark rings characteristic of a Newton's ring pattern. The radius of each ring, $r_n$, may be defined as follows:

$$r_n = R(N - \tfrac{1}{2})\lambda$$

where R is the radius of curvature of the top surface, N is the ring number (for example, N=1 for the smallest bright ring, N=2 for the next largest ring, etc. . . . ), $\lambda$ is the wavelength of light and $r_n$ is the radius of the Nth bright ring. The radius of the rings are also dependent on the thickness of the air gap t:

$$2t = (N - \tfrac{1}{2})\lambda$$

$$r_n = R(2t)$$

Thus, by adjusting the thickness of the air gap, the radius of the rings may also be affected. For example, the air gap may be large enough that the radius of a given ring exceeds the physical dimensions of the display. In such a case, no Newton's ring may be visible.

Returning to the discussion of FIG. 6, the spacers may be various sizes. In one embodiment, the spacer size may be smaller than one quarter of the subpixel dimension of the display. Generally, pixels are picture elements and may be arranged into a grid pattern to display an image. The number of colors that may be presented by a pixel may depend on the number of bits per pixel ("bpp"). For example, a one bpp image may uses one bit per pixel, thus each pixel may be either on or off and a two bpp image may have four colors, a three bpp image may have eight colors and so on. Some displays may not be capable of displaying or sensing different color channels at the same site. These displays may divide the pixel grid into single-color regions with separately addressable elements which may be referred to as "subpixels." In one example, an LCD may divide each pixel horizontally into three subpixels. By sizing the spacers smaller than one quarter of the subpixel dimension of the display, the interference between the spacers and the pixels may be avoided, thus reducing the sparkling effect on a display image.

The spacer size may also be chosen to avoid or reduce the likelihood of the spacers causing cosmetic defects in the display. As the size of the spacer decreases, a user may be less likely to perceive the spacers on the bottom surface of the touch panel 320 or on the top surface of the display module 310. In one embodiment, the bead size of the spacer may be approximately equal to or less than ten micrometers. More specifically, the bead size may be, in one example, six micrometers.

In one embodiment, the density of the spacers on the surface may be low enough to avoid the previously discussed optical effects caused by the AG coating such as diffraction and/or a dull appearance to the display. Additionally, the density of the spacers may be high enough to prevent the display module 310 and the touch panel 320 from coming into physical contact with one another. In one embodiment, any number of spacers between ten and ten thousand spacers per square millimeter may be deposited on facing surfaces of either the display module 310, the touch panel 320 or both.

The spacers may be deposited onto the surface in random locations or may be aligned in patterns. When depositing the spacers randomly across the surface, the density of spacers may be higher than when aligning the spacers in a pattern across the surface to ensure that an adequate number of spacers exists in any given area to prevent contact between the display module 310 and the touch panel 320. Alternatively, the spacers may be deposited in any type of pattern such as a square grid, a spiral, concentric circles and so on.

Any number of methods may be used to deposit the spacers onto the surface including, but not limited to, air spraying, spin coating, photolithography, embossing and so on. The employed method may vary depending on whether the spacers are to be randomly deposited or set in a pattern across the surface. Additionally, different methods may be used depending on the precision needed for depositing the spacers. For example, photolithography may be used to deposit the spacers in a pattern, while spin coating may be used to randomly deposit the spacers across the surface.

Figure 7:
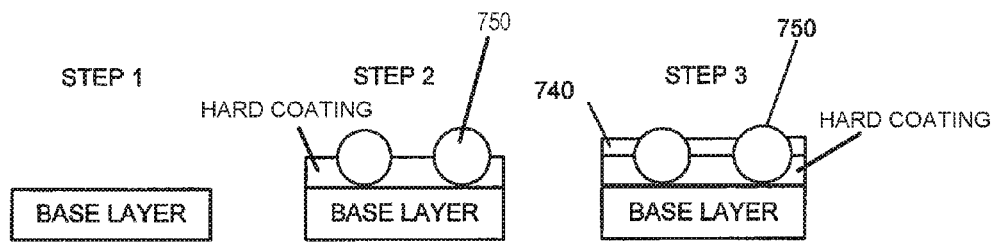
FIG. 7 depicts a sample method for depositing spacers with a hard coating as one layer onto a surface in a display.

In another embodiment and as depicted in FIG. 7, the combination of spacers 750 and anti-reflection coatings 740 may be used to reduce wetting and Newton's ring effects. FIG. 7 provides an illustration of a portion of the layers that may be deposited on at least one of the display module 110 or the cover 120, as the layers cover or at least partially cover the surfaces of at least one of the display module or the cover. Anti-reflection coatings may be applied to surfaces to reduce reflections. The anti-reflection coatings may consist of transparent thin film structures with alternating layers of contrasting refractive indices. The thickness of the layers may be selected so that the reflected and transmitted light may interfere constructively and destructively. The anti-reflection coating may be a single-layer interference coating, multi-layer coatings, an absorbent coating and so on.

Generally, an anti-reflection coating may form the top surface of all the coatings and thereby reduce surface reflections of the display 110. Accordingly, the spacers may not be deposited on top of the anti-reflection coating as no additional coatings may be deposited on top of the anti-reflection coating to secure the spacers on the surface. However, the spacers may be secured by depositing the spacers in conjunction with the hard coating or anti-reflection coating in one layer. Depositing the spacers and the anti-reflection coating in one layer is discussed in further detail below with respect to FIG. 8.

In one embodiment, and as illustrated in FIG. 7, the spacers may be mixed into the hard coating when the coating is a raw liquid material. The hard coating may be deposited onto the base layer as shown in step 2, where the base layer may be any material such as glass, polyethylene terephthalate films ("PET films"), triacetyl cellulose films ("TAC films") and so on. After the hard coating is deposited, it may cure and, as shown in FIG. 7, the spacers may partially protrude beyond the hard coating surface. As shown in step 3, the anti-reflection coating may be deposited after the hard coating has finished curing. In certain embodiments when the anti-reflection coating is deposited, its thickness permits a portion of the spacers to protrude into the air gap. Additionally, because the spacers may be deposited with the hard coating, the method of depositing the hard coating may be selected so that the density of spacers is high enough to ensure the top surface (e.g., touch panel) may physically contact the spacer before it comes into contact with the bottom surface (e.g., display module).

Figure 8:
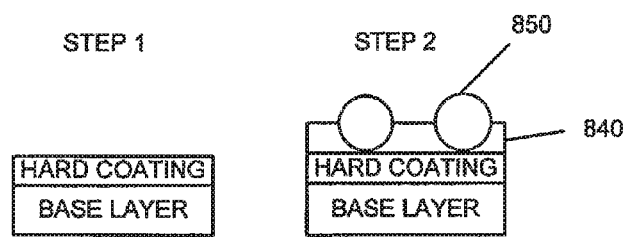
FIG. 8 depicts another sample method for depositing spacers with an anti-reflection coating as one layer, onto a surface in a display.

In another embodiment, and as illustrated in FIG. 8, the spacers 850 may be mixed into the anti-reflection coating 840. In this embodiment, the hard coating may be deposited onto the base layer as shown in step 1. After the hard coating completes curing, the anti-reflection coating may be deposited on top of the hard coating as shown in step 2. Since the spacers are already mixed into the anti-reflection coating they are likewise deposited. Continuing the description of this embodiment, the anti-reflection coating may be selected so that the thickness of the coating (when cured) is less than the diameter of the spacer beads. Thus, the spacer beads may protrude from the anti-reflection coating to prevent the touch panel from physically contacting the display module.

Figure 9:
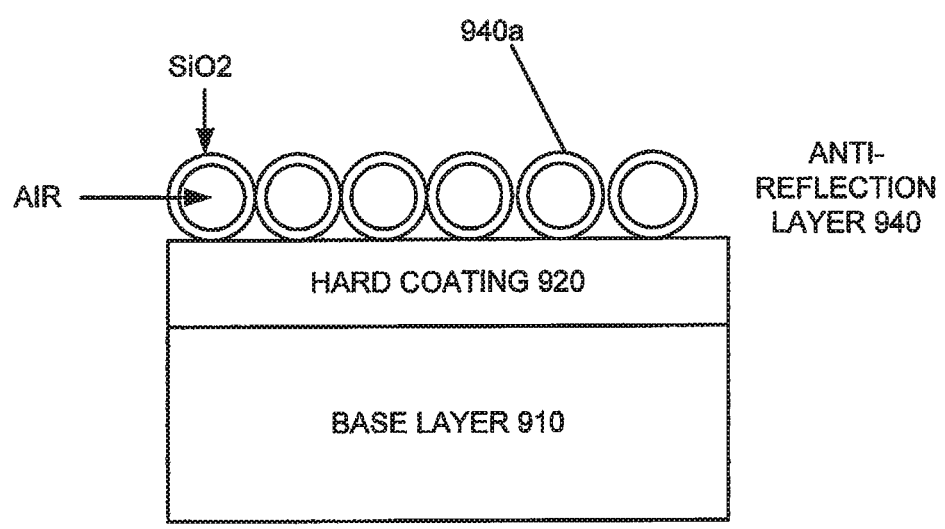
FIG. 9 depicts a general representation of a display with an anti-reflection coating.

Next, the discussion moves to the refractive index of the anti-reflection coating and the spacer beads. FIG. 9 depicts a typical example of a combination of a hard coating and an anti-reflection layer 940 on a base layer. FIG. 9 provides an illustration of a hard coating 920 deposited on top of a base layer 910. In FIG. 9, an anti-reflection layer 940 may be deposited on top of the hard coating 920 and the anti-reflection layer may be a single layer anti-reflection coating which may have a refractive index between the index of refraction of the base layer (where the base layer may be glass, a PET film, a TAC film and so on) and air.

As shown in FIG. 9, the anti-reflection layer 940 may be composed of beads. The desired refractive index (e.g., one between the refractive indices of the base layer and air) may be achieved by making the anti-reflection layer out of hollow beads 940a. In FIG. 9, the wall of the hollow beads may be composed of a solid material while the interior contains air, a vacuum, or some other low index material. The effective index of refraction of the hollow bead may be somewhere between the index of refraction of the wall and the index of refraction of air. In one example, the wall of the hollow bead may be made of silicon dioxide ("SiO2"). Continuing this example, the index of refraction for SiO2 is approximately 1.5 and the index of refraction of air is approximately 1.0. The relative volume of the SiO2, sidewall and interior air may be controlled in each bead to vary the effective refractive index from 1.0 to 1.5. In one embodiment, the effective refractive index may be approximately 1.33.

Figure 10:
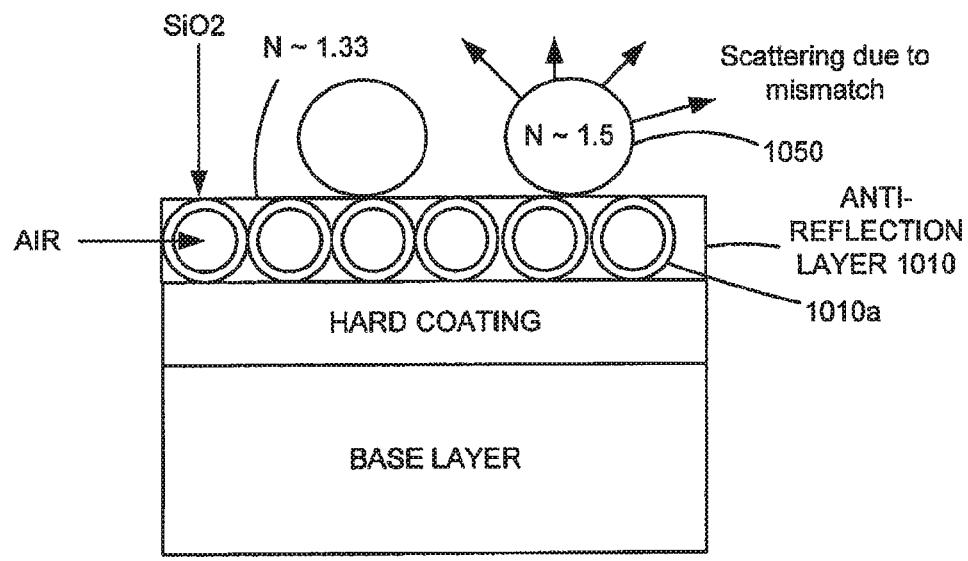
FIG. 10 depicts an embodiment of a display that includes spacers and an anti-reflection coating with different refractive indices.

FIG. 10 illustrates an example of a base layer, a hard coating, an anti-reflection layer with an effective refractive index of approximately 1.33 and spacers with a refractive index of approximately 1.5. As previously discussed with respect to FIG. 9, the anti-reflection coating 1010 may be made up of hollow beads 1010a with an effective refractive index of 1.33. However, as illustrated in FIG. 10 for explanatory purposes, the spacers 1050 may not be hollow and may have an index of refraction of 1.5. As shown in FIG. 10, the index mismatch due to the spacers may cause scattering or a deviation of the light path from other than a path of specular reflection.

In one embodiment, the spacers may be solid beads (not shown) with a similar refractive index to the anti-reflection layer. For example, the anti-reflection layer may have an index of refraction of approximately 1.33 and the spacers may also have an index of refraction of approximately 1.33. Thus, scattering may be reduced or prevented because there may be little to no index mismatch between the spacers and the anti-reflection layer.

Figure 11:
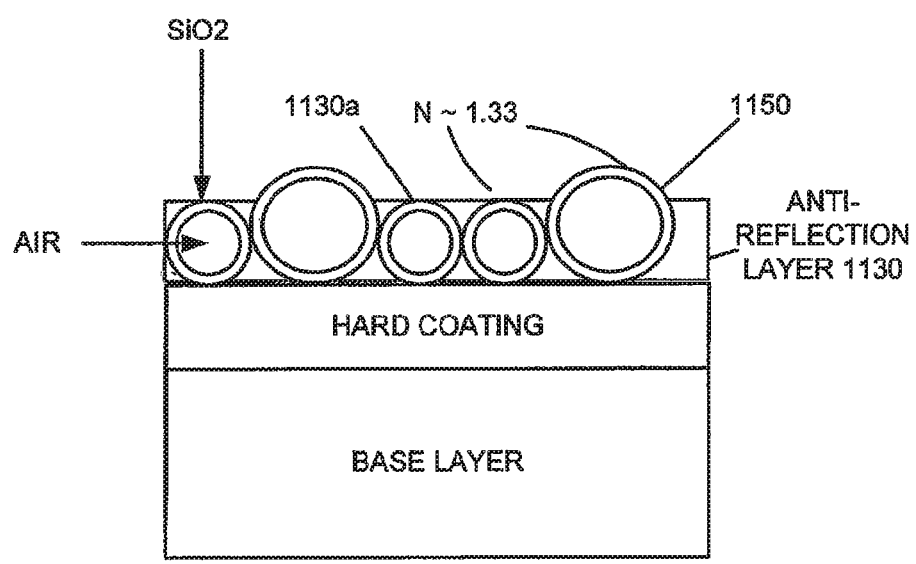
FIG. 11 depicts another embodiment as a system with spacers and an anti-reflection coating with similar refractive indices.

Alternatively, in another embodiment and as depicted in FIG. 11, the spacers 1150 may be included in the anti-reflection layer 1130 and may also have a refractive index of approximately 1.33. Similar to the anti-reflection layer of FIG. 10, the anti-reflection layer of FIG. 11 may also be made up of hollow beads 1130a with an effective refractive index of approximately 1.33. FIG. 11 is distinct from FIG. 10 because the spacers may also be hollow beads with an effective refractive index of approximately 1.33. Because the spacers have an index of refraction that is substantially similar to that of the anti-reflection coating, there may be no index mismatch, and thus, no scattering.

In yet another embodiment, the anti-reflection coating may be composed of a single layer of polymers which may have a refractive index between the refractive indices of glass and air. That is, the polymer may have an index of refraction between the refractive indices of the base layer and air. For example, the polymer may be a fluorinated carbon. Similar to the embodiment of FIG. 11, the spacers in this embodiment may have approximately the same refractive index as the anti-reflection coating. For example, the spacers may be made of the same polymer as the anti-reflection coating.

As previously discussed, two surfaces may have a tendency to stick together once the surfaces come into contact. This effect has been described herein as "wetting." When the surfaces are glossy, the wetting effect or the tendency to stick together may be exacerbated. The energy to separate the two surfaces may be described as:

$$W=2A\gamma$$

W may be the work of cohesion, A may be the surface area of the surfaces and $\gamma$ may be the surface free energy. As the surface free energy decreases, the work of cohesion is reduced at the surfaces and may more easily separate. Stated differently, the likelihood of the two surfaces sticking together decreases as the surface free energy decreases. Accordingly, it may be desirable to treat the bottom surface of the touch panel and the top surface of the display module with a coating to achieve a low surface energy. The low surface energy coating may provide lower surface energy than the original surface, in which the original surface may be, for example, an anti-reflection surface, hard coating surface, plastic surface, glass surface and so on.

As one example, the low surface energy treatment may be a fluorinated polymer coating. The low surface energy treatment may be deposited in conjunction with the spacers and may be deposited as a direct coating on glass. Although the spacers may reduce the likelihood of the surfaces coming into contact with one another, the low surface energy treatment may also be used in conjunction with the spacers. In between the spacers, local deformation from, for example, a stylus touching a screen, may cause the surfaces to come into contact with one another. Thus the low surface energy treatment may reduce the tendency of the surfaces to stick together. The low surface energy treatment may be deposited again, with the spacers, as a film laminated on glass with the low surface energy coating on top of it. The low surface energy treatment may be deposited on either the back surface of the touch panel and/or cover glass, the front surface of the display module or both. Similar to the anti-reflection coatings, the low surface energy treatment may be applied to the surfaces using various techniques including, but not limited to, air spray, spin coating, photolithography, embossing and so on. Additionally, the thickness of the low surface energy treatment once it is deposited may be less than the diameter of the spacers.

Figure 12:
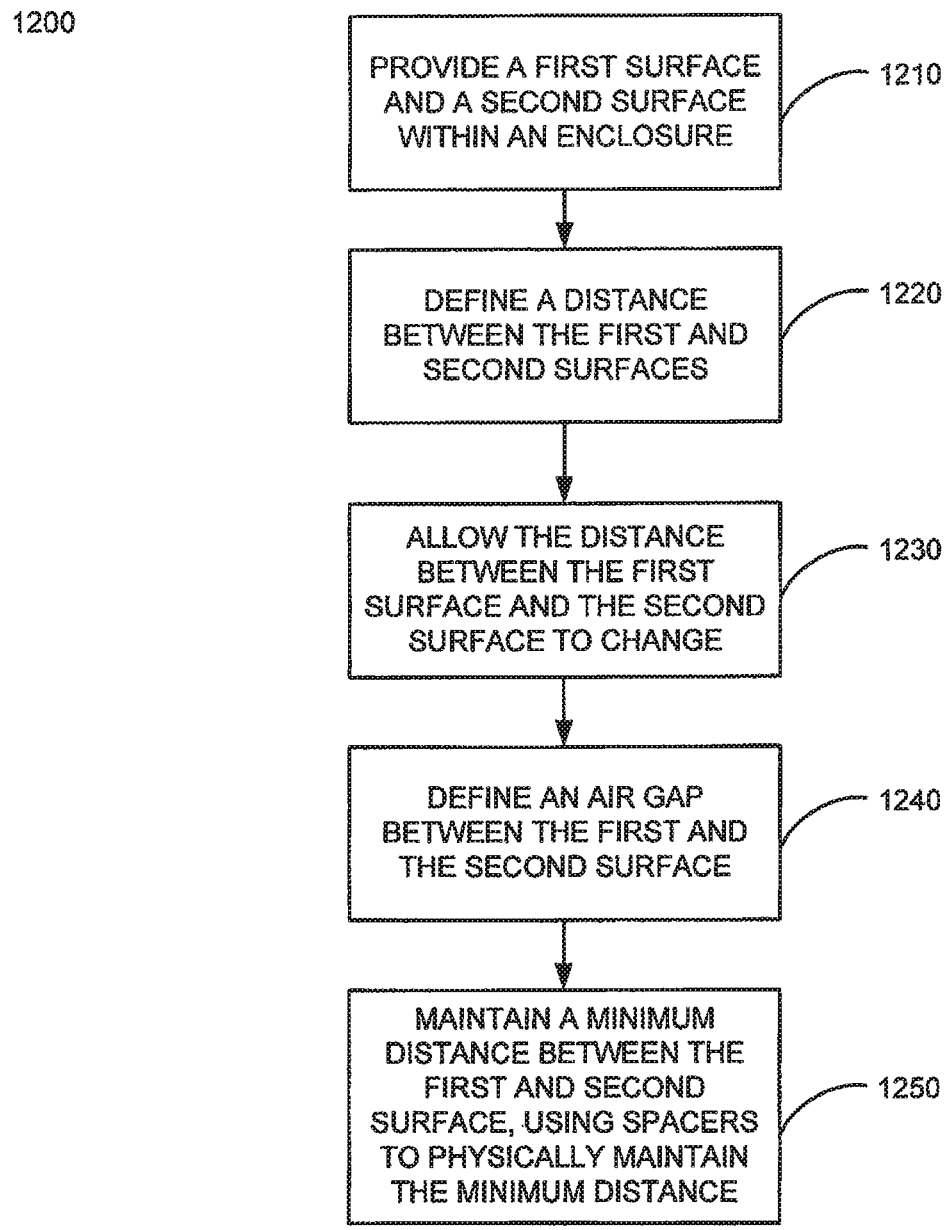
FIG. 12 is a flowchart depicting a sample method for reducing the appearance of optical effects in a display.

FIG. 12 is a flowchart generally describing one embodiment of a method 1200 for reducing the appearance of optical effects on a display. In the operation of block 1210, an enclosure may include a first surface and a second surface. The enclosure may be a casing and may surround at least the first surface and the second surface. The first surface and the second surface may be glossy surfaces. In one example, the first surface may be a cover lens that may protect the second surface and the second surface may be a display module. In another example, the first surface may be a touch panel on an electronic device that may include touch panel functionality. The touch panel may also serve the purpose of protecting the second surface. The display module may be, for example, a display polarizer for the electronic device and may be made of various materials including, but not limited to, glass, a TAC film, a PET film and so on.

In the operation of block 1220, a distance may be defined between the first and second surfaces. The distance may depend upon the form factor of the electronic device. For example, as the profile of the electronic device becomes thinner, the distance between the first and second surfaces may also decrease. As noted in the operation of block 1230, the distance between the first and second surface may also change. As previously discussed, the electronic device may include touch panel functionality. For example, a user may use a stylus to select an option that may be displayed on the electronic device. The user may physically touch the stylus to the touch panel and cause the touch panel to temporarily curve in a downwardly direction toward the display module surface. Additionally, as described in the operation of block 1240, an air gap may be defined between the first and second surface. In particular, the distance between the first and second surface may be the air gap.

In the operation of block 1250, a minimum distance may be maintained between the first and second surface by employing the use of spacers. The spacers may physically maintain the minimum distance between the two surfaces. For example, as the touch panel curves down toward the display module, the touch panel may physically come into contact with the spacers before the touch panel physically touches the display module. The minimum distance may be approximately equal to the diameter of the spacer. As previously discussed, the spacers may be beads that may be spherical beads, elliptical beads, egg shaped and so on. In an exemplary embodiment, the spacers may be any shape that may not have any edges or corners. By using shapes without edges or corners, the likelihood of sparkling and other optical effects is reduced.

Although the present invention has been described with respect to particular apparatuses, configurations, components, systems and methods of operation, it will be appreciated by those of ordinary skill in the art upon reading this disclosure that certain changes or modifications to the embodiments and/or their operations, as described herein, may be made without departing from the spirit or scope of the invention. Accordingly, the proper scope of the invention is defined by the appended claims. The various embodiments, operations, components and configurations disclosed herein are generally exemplary rather than limiting in scope.

What is claimed is:

1. A method for creating a display for an electronic device comprising:
    depositing a coating onto a base layer of a bottom layer;
    depositing a plurality of spacers onto the coating;
    depositing an antireflection layer onto the coating, wherein the antireflection layer comprises a plurality of beads that are separate from the spacers;
    connecting a top layer to the bottom layer to define a gap between the top layer and the bottom layer, wherein in response to a force on the top layer, the gap reduces from a maximum height to a minimum height, and wherein the minimum height is defined by the plurality of spacers.

2. The method of claim 1, wherein the plurality of spacers are mixed within the coating.

3. The method of claim 2, further comprising mixing the spacers into a curable material to create the coating.

4. The method of claim 3, further comprising curing the curable material.

5. The method of claim 3, wherein a thickness of the curable material is less than a diameter of the spacers.

6. The method of claim 1, further comprising mixing the spacers with the antireflection layer.

7. The method of claim 6, wherein depositing the plurality of spacers onto the coating comprises depositing the mixture of the spacers and the antireflection layer onto the coating.

8. The method of claim 7, wherein the coating is a hard coating.

9. The method of claim 1, wherein the spacers are hollow.

10. The method of claim 1, wherein the spacers are translucent.

11. The method of claim 1, wherein a diameter of the spacers is less than the maximum height.

12. The method of claim 1, wherein the antireflection layer is interposed between the plurality of spacers and the coating.

13. The method of claim 1, wherein the antireflection layer comprises the plurality of beads and the plurality of spacers such that the plurality of beads and the plurality of spacers are deposited in a single layer on the coating.

14. The method defined in claim 13, wherein a diameter of at least one of the plurality of spacers is greater than a diameter of at least one of the plurality of beads.

\* \* \* \* \*